United States Patent [19]

Mourier

[11] 3,868,424

[45] Feb. 25, 1975

[54] PROCESS FOR THE PREPARATION OF ORTHO-HYDROXYBENZYL ALCOHOLS

[75] Inventor: Emile Mourier, Villeurbanne, France

[73] Assignee: Rhone-Poulenc S.A., Paris, France

[22] Filed: Nov. 23, 1970

[21] Appl. No.: 92,312

[30] Foreign Application Priority Data
Nov. 24, 1969 France .............................. 69.40394

[52] U.S. Cl. .............................. 260/621, 260/462 R
[51] Int. Cl. ........................ C07c 27/00, C07c 37/00
[58] Field of Search ......... 260/621 R, 462 R, 621 K

[56] References Cited
UNITED STATES PATENTS

| | | | |
|---|---|---|---|
| 3,067,235 | 12/1962 | Mivviss ...................... | 260/621 R X |
| 3,194,834 | 7/1965 | Pressword ................... | 260/621 R X |
| 3,255,242 | 6/1966 | Bolhofer ..................... | 260/621 R X |
| 3,290,393 | 12/1966 | Marchand et al .............. | 260/621 R |
| 3,549,709 | 12/1970 | Achard et al. .............. | 260/621 R X |
| 3,553,271 | 1/1971 | Crenne et al. ............. | 260/621 R X |

OTHER PUBLICATIONS

"Handbook of Chemistry and Physics," Chemical Rubber Co., 46th Edition, 1965 pp. D5-7, 10, 12 and 15-18.
Peer "Rec. Trav Chim," Vol. 79, pp. 825–835.

*Primary Examiner*—Bernard Helfin
*Assistant Examiner*—Norman Morgenstern
*Attorney, Agent, or Firm*—Stevens, Davis, Miller & Mosher

[57] ABSTRACT

Ortho-hydroxybenzyl alcohols are obtained from phenols having an unsubstituted ortho-position by reacting the phenol with a boric acid or boron trioxide, treating the reaction product with formaldehyde and hydrolysing the resulting ortho-hydroxybenzyl metaborate ester in the presence of an ester $R_1$—O—$R_2$, where $R_1$ and $R_2$ are alkyl, alkoxyalkyl or aryl, preferably diisopropyl ether.

6 Claims, No Drawings

PROCESS FOR THE PREPARATION OF ORTHO-HYDROXYBENZYL ALCOHOLS

The present invention relates to a process for the preparation of ortho-hydroxybenzyl alcohols from phenols and in particular, to the preparation of saligenol from ordinary phenol.

In our French Pat. No. 1,328,945, we describe a process for the preparation of ortho-hydroxybenzyl alcohols in three stages which consists of:

a. reacting a phenol having at least one hydrogen atom in the ortho position to the hydroxyl radical, with a boric acid or boron trioxide to obtain the meta-borate ester of this phenol, b. condensing formaldehyde with this ester, producing the meta-borate ester of an ortho-hydroxybenzyl alcohol, and c. hydrolysing this ester to liberate the desired alcohol.

These stages will hereafter respectively be described as boratation, condensation and hydrolysis.

It has subsequently been found, and it is this which is the subject of the present invention, that it was desirable to improve this process especially with a view to recovering the boric acid employed. In view of the large amounts of boron compound used in this known process, it is desirable, for the economics of the process, to recover, in an easy manner, the greatest possible amount thereof and the present invention is directed to a process which enables such recovery to take place.

The present invention provides a process for the preparation of an ortho-hydroxybenzyl alcohol from a phenol having at least one hydrogen atom in the ortho-position to the hydroxyl radical, wherein the phenol is reacted with a boric acid or boron trioxide, the resulting reaction product treated with formaldehyde and the resulting orthohydroxybenzyl meta-borate ester hydrolysed in the presence of an aliphatic or aromatic ester of general formula $R_1-O-R_2$, in which $R_1$ and $R_2$ which may be identical or different, each represent an alkyl, alkoxyalkyl or aryl radical.

Suitable ethers include the aliphatic ethers such as the dipropyl and diisopropyl, dibutyl and diisobutyl ethers, and the commercially available diethers and polyethers of ethylene glycol or of triethylene glycol, such as dibutylcellosolve and dibutylcarbitol. Amongst the aromatic ethers, diphenyl ether, anisole and phenetole can also be used. More generally, any ether may be selected which will be a good solvent for the desired ortho-hydroxybenzyl alcohol but will be neither miscible with water nor a solvent for the boric acid. Thus the cyclic ethers such as tetrahydrofurane and dioxane cannot be used advantageously because of their miscibility with water. Furthermore, the ether chosen must preferably have a high boiling point so as to carry out the process under atmospheric pressure, and it must also be stable to heat and to the products employed in the reaction.

By o-hydroxybenzyl alcohols there are understood, here and in the subsequent text, not only saligenol but also saligenol derivatives obtained by substitution of the nucleus by radicals which are inert under the reaction conditions. Such nucleus substituents may be for example, hydrocarbon radicals such as alkyl radicals having one to 12 carbon atoms, aryl radicals such as phenyl, alkoxy radicals having one to 12 carbon atoms such as methoxy and ethoxy, and halogen atoms such as F, Cl, Br and I.

A practical and advantageous means of carrying out the process involves effecting the boratation and condensation stages in the same ether as that chosen for the hydrolysis, so as to carry out the entire preparation in a single solvent, which simplifies the process. However, as has been stated above, it is only essential in the present invention to carry out the hydrolysis in an ether, and in this case it is not necessary first to remove the solvent from the preceding stages; the hydrolysis is then carried out in a solvent mixture of which the principal constituent is the chosen ether, i.e., the ether comprises at least 50% by weight of the solvent mixture.

Whether the ether is present only during hydrolysis, or during boratation and condensation also, the process is otherwise effected under the working conditions set out in French Pat. No. 1,328,945.

The amount of ether employed can vary for the various stages. In the boratation, the ether serves to carry away the water formed and to prevent the phenol being carried away. The amount used can vary depending on the nature of the ether and must be compatible with a temperature of the order of 200° C. for completing the reaction. For the condensation, a sufficient amount of ether to maintain the reaction mixture liquid at the working temperature is required. Finally, before the hydrolysis of the meta-borate ester, the reaction mixture is diluted with a sufficient amount of ether for all the o-hydroxybenzyl alcohol liberated to be dissolved, whilst the boric acid precipitates. The o-hydroxybenzyl alcohol is then isolated from its solution in the ether by recrystallisation and/or distillation of the solvent.

The Examples which follow illustrate the process of the invention, carried out in the two versions indicated above.

EXAMPLE 1

94 g. of phenol (1 mol), 62 g. of boric acid (1 mol) and 20 g. of diisopropyl ether are introduced into a flask of 1 litre volume, equipped with a stirrer rotating at 300 rpm, a reflux column filled with Raschig rings and an analyser-decanter.

The mixture is heated under reflux at atmospheric pressure until no further water is carried away, the temperature of the mixture at the end of the experiment being 220° C. The amount of water carried away is 36 g. The reaction mixture is transferred into a Pyrex autoclave equipped with a stirrer rotating at 33 rpm, 30 g. of trioxymethylene and 230 g. of diisopropyl ether are added, and the mixture is then heated for 2 hours at 95° C. under autogenous pressure. After cooling, the reaction mixture is transferred into an Erlenmeyer flask of 2 litres' volume, and diluted with 750 g. of diisopropyl ether. 108 g. of cold water (three times the theoretical amount) are then run in, and the boric acid precipitates instantaneously. The mixture is filtered on a glass frit and the boric acid is washed with three 30 g. portions of diisopropyl ether. A white product containing 99% of acid is thus obtained. Allowing for the boric acid which has remained in solution in the aqueous layer, the recover yield of boric acid is 98%. The filtrate and the wash ether are combined and washed with 100 cm³ of a 10% aqueous solution of sodium bicarbonate and then with two 50 g. portions of water, and the organic layer is concentrated by distillation in vacuo at a temperature of at most 40° C. The mixture is cooled in an ice bath, and 67.2 g. of saligenol, of melting point 82° C, are separated off by filtration. Evaporation to dryness of the filtrate at a temperature of at most 40° C yields 24.4 g. of crystalline saligenol of melting point 72° to 80° C. Overall yield: 73.9% relative to the phenol introduced.

EXAMPLES 2 TO 5

The conditions of Example 1 are repeated, but replacing the diisopropyl ether as solvent for the saligenol with di-n-butyl ether, ethylphenyl-ether (phenetol), 1,2-dibutoxy-ethane (dibutylcellosolve) and diethylene glycol butyl ether (dibutylcarbitol).

Because of the high boiling point of these solvents, the condensation stage is carried out in the same flask as that for the boratation, topped by a reflux condenser. The amounts of solvent employed in the three stages of the process, and the results obtained, are set out in Table I.

TABLE I

|  | di-n-butyl ether | Phenetol | Dibutyl-cellosolve | Dibutyl-carbitol |
|---|---|---|---|---|
| Weight of ether employed for the boratation (g) | 20 | 50 | 250 | 250 |
| Weight of ether employed for the condensation | 250 | 250 | 250 | 250 |
| Weight of ether employed for the hydrolysis (g) | 2,000 | 1,000 | 580 | 300 |
| Boric acid recovered | 95% | 89% | 85% | 90% |
| Determined yield of saligenol* | 70% | 74% | 73% | 72% |

*chromatographic determination in the gaseous phase in accordance with the method described by H. P. HIGGINBOTTOM Analytical Chemistry 37, 1021-1026 (1965). This determination is expressed relative to the phenol introduced.

EXAMPLE 6

2,000 g. of a fluid sludge of saligenyl meta-borate, containing 53% of toluene, prepared from 470 g. of phenol (5 mols), are treated in accordance with the process described in Example 1 of French Pat. No. 1,328,945. The hydrolysis treatment is carried out in a Pyrex flask of 6 litres volume equipped with an intensive stirrer, a thermometer and a dropping funnel, and externally cooled by means of a water bath at 15° C. 2,200 g. of diisopropyl ether are introduced into the flask, the broth is then introduced rapidly whilst stirring, 280 g. of water are run in over a 20 minute period, and the mixture is stirred for 2 hours. The resulting broth is filtered on a Buchner funnel. The cake of boric acid, washed on top of the filtrate, with 250 g. of diisopropyl ether and then 250 g. of toluene, is dried in hot air at 60° C. 301 g. of ortho-boric acid of 96.6% purity (recovery of boric acid about 94%) are recovered.

The filtrate is again introduced into the flask of 6 litres volume; 460 g. of water and 60 g. of sodium bicarbonate are added at 20° C. with stirring which is continued for 30 minutes, and the mixture is then left to settle. The diisopropyl ether is removed from the organic layer by distillation at 250 mm. mercury pressure, and the hot toluene solution of saligenol is recrystallised by cooling to 20° C. The saligenol is filtered off, washed with 250 g. of toluene and dried with a stream of hot air. 330 g. of saligenol are obtained as a fine white powder of melting point 83.5°–84.5° C. This is a pure product, the properties of which remain unchanged after two months' storage.

65 g. of saligenol are chromatographically determined in the toluene layers. The total yield (saligenol isolated and saligenol determined in the toluene layers) is 64% relative to the phenol introduced.

I claim:

1. In a process for the preparation of an ortho-hydroxybenzyl alcohol from a phenol having at least one hydrogen atom in the ortho position to the hydroxyl radical, wherein the phenol is reacted with a boric acid or boron trioxide, the resulting reaction product treated with formaldehyde and the resulting ortho hydroxybenzyl meta-borate ester hydrolysed, the improvement which comprises hydrolyzing the orthohydroxybenzyl meta-borate ester by contacting said ester with a mixture consisting essentially of water and an ether selected from the group consisting of dipropyl ether, diisopropyl ether, dibutyl ether, diisobutyl ether, a diether or polyether of ethylene glycol, a diether or polyether of triethylene glycol, diphenyl ether, anisole and phenetole.

2. Process according to claim 1, wherein the reaction with the boric acid or boron trioxide, the treatment with formaldehyde and the hydrolysis are carried out in the same ether.

3. Process according to claim 1, wherein the ether is diisopropyl ether.

4. Process according to claim 1, wherein the starting phenol is phenol itself (monohydroxy benzene).

5. Process according to claim 1 wherein substantially equimolar quantities of phenol and boric acid are heated together under reflux in the presence of the ether until substantially no further water is evolved, the reaction mixture is then heated with trioxymethylene and a further quantity of the ether, the reaction mixture then cooled, diluted with a further quantity of the ether, water then added to precipitate boric acid and form an aqueous layer, the ether separated from the aqueous layer and saligenol recovered from the ether.

6. Process according to claim 5, wherein the ether is diisopropyl ether.

* * * * *